United States Patent [19]
Glynn et al.

[11] Patent Number: 5,609,317
[45] Date of Patent: Mar. 11, 1997

[54] MAGNETIC CLAMP

[75] Inventors: Ira J. Glynn, Rogers; Karl-Heinz Pohl, Plymouth, both of Minn.

[73] Assignee: Glynn Company, Inc., Minnetonka, Minn.

[21] Appl. No.: 374,253

[22] Filed: Jan. 18, 1995

[51] Int. Cl.⁶ ..................................................... A47G 1/17
[52] U.S. Cl. ........................ 248/206.5; 248/683; 40/600; 40/607
[58] Field of Search ............................... 248/206.5, 683, 248/467, 214, 207, 309.1, 314; 40/600, 10 R, 642, 607; 403/DIG. 1, 273, 326, 329; 49/478.1

[56] References Cited

U.S. PATENT DOCUMENTS

| | | | |
|---|---|---|---|
| D. 229,706 | 12/1973 | Lewis | D34/13 A |
| D. 288,371 | 2/1987 | Lacher et al. | D26/50 |
| D. 322,634 | 12/1991 | Callas | D20/44 |
| D. 342,434 | 12/1993 | Glynn | D8/73 |
| D. 342,659 | 12/1993 | Glynn | D8/73 |
| 1,473,504 | 11/1923 | Neely | 248/228 |
| 2,437,344 | 3/1948 | Behlman | 174/163 |
| 2,869,812 | 1/1959 | Hamel | 248/42 |
| 3,136,515 | 6/1964 | Potruch | 248/62 |
| 3,296,725 | 1/1967 | Fenwick | 40/10 |
| 3,978,610 | 9/1976 | Stubbman | 46/32 |
| 4,114,326 | 9/1978 | Macuca et al. | 52/28 |
| 4,677,780 | 7/1987 | Shuman | 40/600 |
| 4,757,623 | 7/1988 | Seyler | 40/152.1 |
| 4,776,116 | 10/1988 | Shuman | 40/642 |
| 4,876,812 | 10/1989 | Haralson | 40/600 |
| 4,960,258 | 10/1990 | Stocker et al. | 248/467 |
| 4,967,500 | 11/1990 | Bredeweg | 40/658 |
| 5,029,378 | 7/1991 | Stocker et al. | 29/462 |
| 5,060,977 | 10/1991 | Saito | 24/303 |
| 5,188,332 | 2/1993 | Callas | 248/544 |
| 5,237,767 | 8/1993 | Krinzel et al. | 40/642 |
| 5,257,472 | 11/1993 | Harnois et al. | 40/606 |
| 5,311,647 | 5/1994 | Levy | 24/303 |
| 5,472,163 | 12/1995 | Callas | 40/600 |

FOREIGN PATENT DOCUMENTS 407444 of 1966 Switzerland ............................. 24/303

OTHER PUBLICATIONS

Glynco Plastics brochure, "Your Quality Plastic Specialist".
"The Slimline Clamp" Glynco Plastics brochure.
"New . . . The First Total Look Interior" Glynco Plastics brochure.

*Primary Examiner*—Leslie A. Braun
*Assistant Examiner*—Willie Berry, Jr.
*Attorney, Agent, or Firm*—Palmatier, Sjoquist, Helget & Voigt, P.A.

[57] ABSTRACT

A magnetic clamp releasably engageable by magnetism to a metallic surface includes a housing with an interior and opposing resilient walls. A magnetic body is placeable within the interior of the housing. Mechanical interference components are on the magnetic body and housing to permanently secure the magnetic body within the interior of the housing upon placement of the magnetic body within the housing interior.

30 Claims, 2 Drawing Sheets

MAGNETIC CLAMP

BACKGROUND OF INVENTION

This invention relates to a magnetic clamp suitable for display equipment or signage and more particularly to a magnetic clamp wherein the magnetic body within the housing of the clamp is easily assembled and held in place by irreversible mechanical interference.

Clamps used for supporting signage at retail point-of-displays are well known. Clamping systems typically used in mounting signage for display are often cumbersome in that they involve telescoping C-clamp screws and magnetic clamps. Such clamps are labor intensive in both their manufacture and use.

Particularly, magnetic clamps are commonly held together by glue, necessitating human assembly which requires technical application of the appropriate amount and location of the glue and further requires curing. With time, the glue often becomes loosened and the clamp may come apart. Other types of screw, pin or telescoping C-clamps require human labor to assemble the various parts, as well as adjustments for actual use.

These types of clamps are commonly used in retail stores, such as those for clothing and the like, for presentation to the buying public. Clothes are often in a folded condition, dressed upon a mannequin or suspended from hangers. Associated with retail display racks are metal rods or stands which often support horizontal rods or surfaces suitable for magnetic clamps. However, the signage, including frames and card holders, commonly have considerable overlying weight by virtue of their necessary size for ease of visibility for consumers. Such sign holders are commonly mounted on a central downward extending stem.

There is a need for a simple magnetic clamp which utilizes a minimum of parts and minimal human labor in assembly. Such a clamp should be simple and not require complicated components to hold the clamp and magnets together as well as not being dependent upon glue application. Such a clamp should also be easily mounted and dismounted from a metallic surface for easy use.

SUMMARY OF THE INVENTION

A magnetic clamp releasably engageable by magnetism to a metallic surface includes a housing with an interior and opposing resilient walls. A magnetic body is placeable within the interior of the housing. Mechanical interference components are on the magnetic body and housing to permanently secure the magnetic body within the interior of the housing upon placement of the magnetic body within the housing interior.

A principal object and advantage of the present invention is the creation of a magnetic clamp that assembles without glue or complicated mechanical holding techniques to include screws, pins or the like requiring manual assembly.

Another object and advantage of the present invention is that the magnetic clamp has mechanical interference components on the magnetic body and housing to permit the magnetic body to be permanently placed into the housing in an automated fashion and to effectively snap the magnetic body into an interlocking permanent relationship within the housing.

Another object and advantage of the present invention is that the magnetic clamps housing is made from a plastic material which permits the housing to be resilient or flexible for easy insertion of the magnetic body with mechanical interfering tabs for a permanent interlocking arrangement of the clamp as heretofore not known.

Another object and advantage of the present invention is that the magnetic clamp will permit its clamping character to be utilized on at least two differently sized metal surfaces or rods without necessitating any adjustment.

Another object and advantage of the present invention is that the housing is made of plastic which is impact resistant should the clamp be dropped or knocked to the floor.

Another object and advantage of the present invention is that its assembly by mechanical interference of the magnetic body and housing makes the clamp extremely economical to manufacture and is of such a construction that it will not come apart as do prior clamps and further does not require adjustment for use.

Other objects and advantages will become readily apparent upon review of the following figures, specification and appended claims.

DETAILED DESCRIPTION OF THE INVENTION

Figure 1:
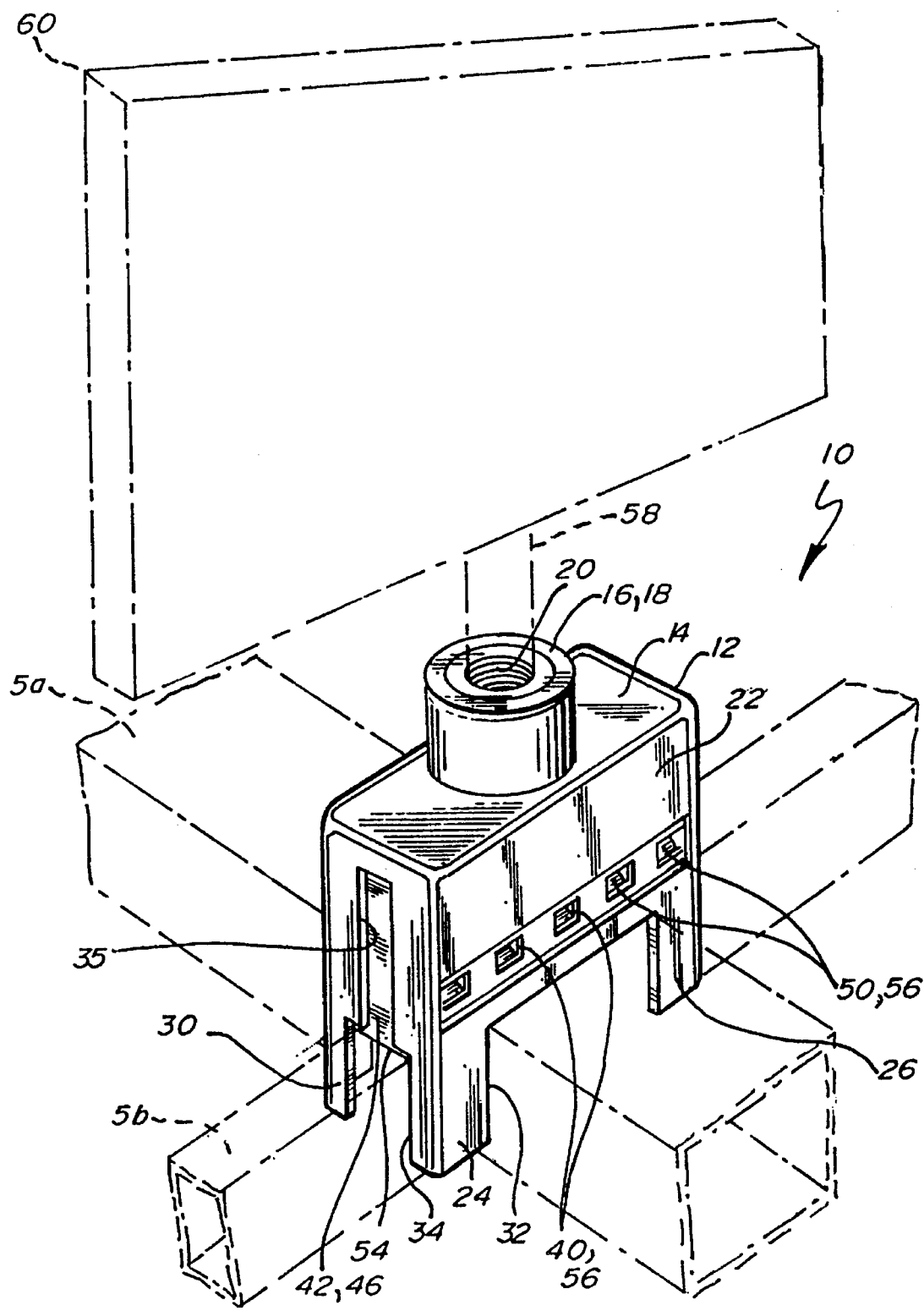
FIG. 1 is a perspective view of the magnetic clamp of the present invention supporting a stem and signage shown in phantom outline and also illustrating the clamp's adaptability to at least two differently sized horizontal surfaces or rods also shown in phantom outline.
Figure 2:
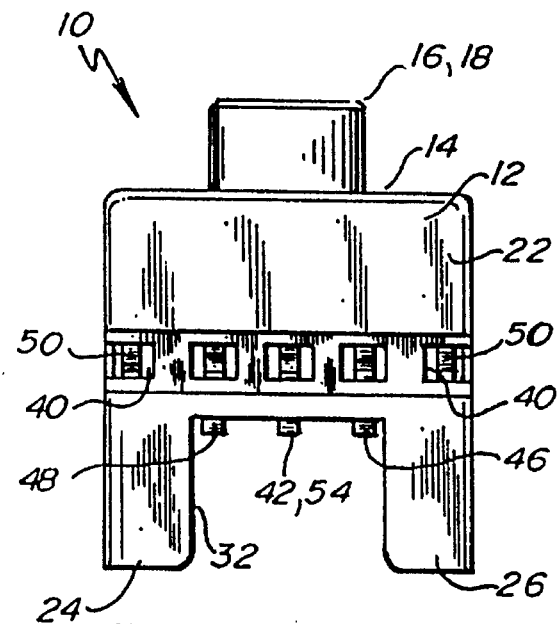
FIG. 2 is a front or side elevational view of the clamp.
Figure 3:
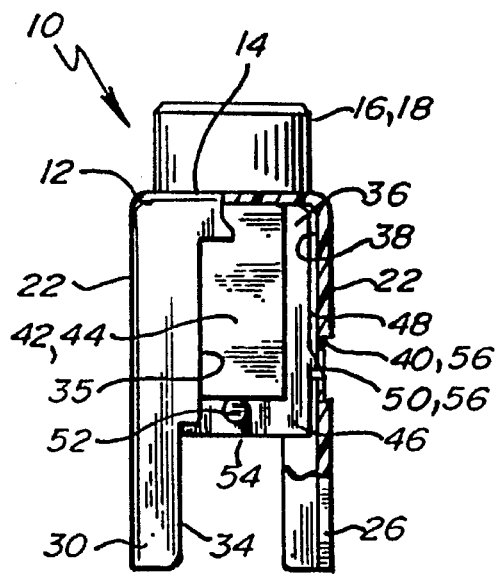
FIG. 3 is a side elevational view of the clamp.
Figure 4:
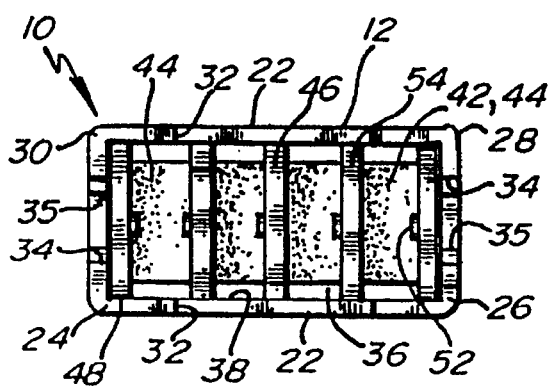
FIG. 4 is a bottom plan view of the clamp.
Figure 5:
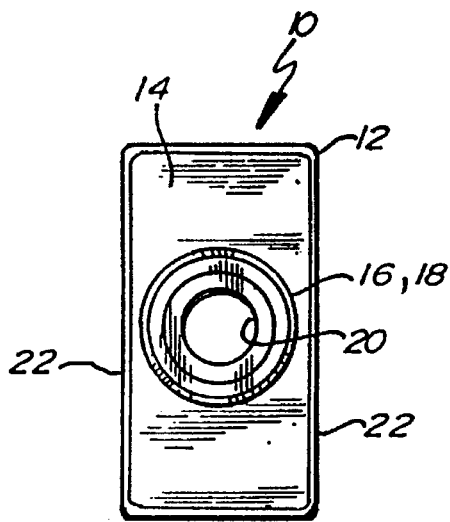
FIG. 5 is top plan view of the clamp.

Referring to FIGS. 1–5, the magnetic clamp 10 may be generally understood. The clamp 10 generally includes housing 12, support means 16 and magnetic body 42 permanently held within housing 12 by simple mechanical interference. Magnetic clamp 10 may readily support a sign 60 by a threaded rod while being magnetically clamped onto a metal rod or surface 5, either of which may be wide 5a or narrow 5b.

Specifically, magnetic clamp 10 is comprised of a housing 12 suitably made of a plastic, such as thermoplastic or thermoset. A plastic housing 12 will permit the housing 12 to somewhat flex or be resilient. Housing 12 includes a top wall 14 with a support means 16 for threaded rod 58. The support means 16 may include a collar or annular rim 18 with a threaded aperture 20 in its center. Housing 12 also includes four side walls 22.

Depending downwardly from the sidewalls 22 of housing 12 are optionally four resilient legs 24, 26, 28 and 30. Widely spaced apart pairs of legs 24, 26 and 28, 30 form a wide channel 32 to permit the magnetic clamp 10 to suitably magnetically clamp upon a wide surface or metal rod 5a. Narrowly spaced pairs of legs 26, 28 and 30, 24 form a narrow channel 34 whhich permits tshe clamp 12 to suitably nagnetically clamp upon a narrow metal rod or surfacd 5b. Between the narrowly spaced pairs of legs 26, 28 and 30, 24 are cutouts 35 which permit the side walls 22 to flex or resiliently move with respect to each other. Housing 12 also has an interior 36 with an inner side wall 38 in which are slots, apertures, grooves or indentations 40. It must be noted that any pair of legs 24, 26, 28 or 30 will work well with housing 12.

Within the interior 36 of housing 12 is the magnetic body 42 suitably held thereat by mechanical interference. Magnetic body 42 is comprised of alternating magnets 44 and metal pole plates 46. The magnets are oriented so that the matching "south" and "north" poles of the magnets 44 are adjacent each other and spaced by the metal pole plates 46 to assure maximum magnetic clamping strength. The side faces 48 of pole plates 46 have protruding tabs, fingers or teeth 50 which will suitably interlock, preferably irreversibly, in slots, apertures, grooves or indentations 40 in the inner side walls 38 of housing 12. Also located on pole plates 46 are indexing ears 52 for proper initial orientation of the magnets 44 with respect to the metal pull plates 46. The bottom of pole plates 46 form metal surface engaging face 54 which will suitably clamp onto the metal surface 5 by magnetism to support a sign 60 by the support means 16.

It may now be appreciated that the mechanical interference or interlocking means 56 of the magnetic clamp 10 includes the tabs 50 which lock into slots 40 when the magnetic body 42 is placed within the interior 36 of housing 12. This placement may be undertaken by an automated machine which requires a minimum of labor and no glue, screws or other complicated mechanical locking means.

Once assembled, the operation of the magnetic clamp 10 may now be appreciated. The threaded rod 58 may be placed into the threaded aperture 20 and support a sign 60. Thereafter, the magnetic clamp may be placed upon a metal surface. The optional legs 24, 26, 28 and 30 permit the saddling of magnetic clamp 10 about either a wide rod 5A or a narrow rod 5B by way of wide channel 32 and narrow channel 34. Without the legs 24, 26, 28 and 30, the magnetic clamp 10 suitably may be mounted on a flat metal surface 5. The magnetic clamp 10 may be removed from the metal surface 5 by gripping the housing 12 and pulling it away from the metal surface 5.

It may now be appreciated that various mechanical interference or interlocking arrangements may be used other than tabs 50 and slots 40. The present arrangement is chosen for simplicity and automated assembly although other variations may work well. Similarly, the legs 24, 26, 28 and 30 may be of different dimensions to create variations of channels 32 and 34. The cutouts 35 of housing 12 permit the side walls 20 to flex and to permit a slight expansion with resiliency so that the magnetic body 42 snaps into the interior 36 and is held thereat by tabs 50 and slots 40. Also, the magnetic clamp 10 may have applications beyond signage and is shown here for illustration purposes only.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. A clamp releasably engageable by magnetism to a metal surface comprising:
   (a) a substantially rectangular housing with an interior and four side walls;
   (b) a magnetic body comprises alternating magnets and metal pole plates forming side faces and a metal surface engaging face and an indexing ear on each pole plate for proper initial orientation of the magnets with respect to the pole plates, the magnetic body placeable within the interior; and
   (c) mechanical interference means on the magnetic body and housing for securing the magnet within the interior of the housing.

2. The clamp of claim 1, further comprising support means on the housing for supporting a sign while the magnetic body holds the housing on the metal surface.

3. The clamp of claim 1, wherein the opposing walls are resilient.

4. The clamp of claim 1, wherein the housing is made of thermoplastic.

5. The clamp of claim 1, wherein the housing is made of thermoset.

6. The clamp of claim 1, wherein the mechanical interference means comprises the combination of a tab interlockable in a slot on the interior side of one wall and the magnetic body.

7. The clamp of claim 1, wherein the mechanical interface means comprises the combination of a tab on one side face interlockable with a slot on the adjacent interior side of the opposing wall.

8. A signage clamp for supporting a sign on a metal rod, comprising:
   (a) a rectangular housing with opposing walls, an interior and first interlocking means on the interior side of one wall;
   (b) a magnetic body placeable within the interior with second interlocking means cooperative and engageable with the first interlocking means for securing the magnet within the interior of the housing;
   (c) support means on the housing for supporting the sign while the magnetic body holds the housing on the rod; and
   (d) four depending legs for straddling the rod.

9. The clamp of claim 8, wherein the opposing walls are resilient.

10. The clamp of claim 8, wherein the housing is made of thermoplastic.

11. The clamp of claim 8, wherein the housing is made of thermoset.

12. The clamp of claim 8, wherein the support means comprises a threaded aperture in the housing, a signage support rod interlockable with the sign.

13. The clamp of claim 8, further comprising a wide channel between a first pair of legs and a narrow channel between a second pair of legs to permit the clamp to fit on two differently sized rods.

14. The clamp of claim 8, wherein the magnetic body comprises alternating magnets and metal pole plates forming side faces and a metal rod engaging face.

15. The clamp of claim 14, further comprising an indexing ear on each pole plate for proper initial orientation of the magnets with respect to the pole plates.

16. The clamp of claim 14, wherein the second interlocking means comprises a tab on one side face interlockable with the first interlocking means which is a slot on the adjacent interior side of the opposing wall.

17. The clamp of claim 8, wherein the first and second interlocking means comprises the combination of a tab interlockable in a slot on the interior side of one wall and the magnetic body.

18. A clamp releasably engageable by magnetism to a metal surface, comprising:
   (a) a housing with an interior and resilient opposing walls;
   (b) a magnetic body placeable within the interior comprising alternating magnets and pole plates;
   (c) mechanical interference means on the magnetic body and housing for securing the magnet within the interior of the housing; and
   (d) four depending legs for straddling the metal surface.

19. The clamp of claim 18, further comprising support means on the housing for supporting a sign while the magnetic body holds the housing on the metal surface.

20. The clamp of claim 18, wherein the housing is made of thermoplastic.

21. The clamp of claim 18, wherein the housing is made of thermoset.

22. The clamp of claim 18, further comprising a wide channel between a first pair of legs and a narrow channel between a second pair of legs to permit the clamp to fit on two differently sized metal surfaces.

23. The clamp of claim 18, wherein the mechanical interference means comprises the combination of a tab interlockable in a slot on the interior side of one wall and the magnetic body.

24. The clamp of claim 18, further comprising an indexing ear on each pole plate for proper initial orientation of the magnets with respect to the pole plates.

25. A clamp releasably engageable by magnetism to a metal surface, comprising:

(a) a housing with an interior and opposing walls;

(b) a magnetic body placeable within the interior; and (c) mechanical interference means on the magnetic body and housing for securing the magnet within the interior of the housing, wherein the magnetic body comprises alternating magnets and metal pole plates forming side faces and a metal surface engaging face, further comprising an indexing ear on each pole plate for proper initial orientation of the magnets with respect to the pole plates.

26. The clamp of claim 25, further comprising support means on the housing for supporting a sign while the magnetic body holds the housing on the metal surface.

27. The clamp of claim 25, wherein the opposing walls are resilient.

28. The clamp of claim 25, wherein the housing is made of thermoplastic.

29. The clamp of claim 25, wherein the housing is made of thermoset.

30. The clamp of claim 25, wherein the mechanical interference means comprises the combination of a tab interlockable in a slot on the interior side of one wall and the magnetic body.

* * * * *

UNITED STATES PATENT AND TRADEMARK OFFICE
CERTIFICATE OF CORRECTION

PATENT NO. : 5,609,317

DATED : March 11, 1997

INVENTOR(S) : Ira J. Glynn & Karl-Heinz Pohl

It is certified that error appears in the above-identified patent and that said Letters Patent is hereby corrected as shown below:

Column 2, line 59, delete "tshe" and insert --the--.

Column 2, line 60, delete "nagnetically" and insert --magnetically--.

Column 2, line 59, delete "whhich" and insert --which--

Signed and Sealed this

Twentieth Day of May, 1997

Attest:

BRUCE LEHMAN

Attesting Officer

Commissioner of Patents and Trademarks